Aug. 23, 1932.  J. P. RATIGAN  1,873,325
SHOCK ABSORBING CONNECTER
Filed Sept. 23, 1929
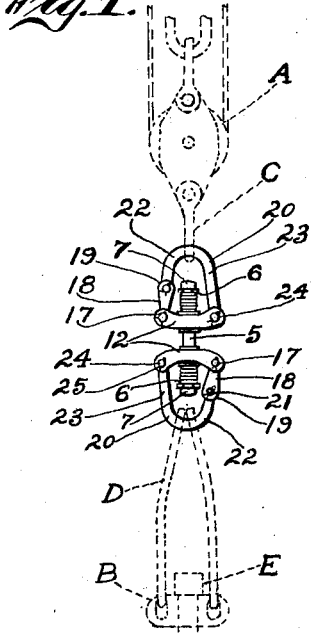
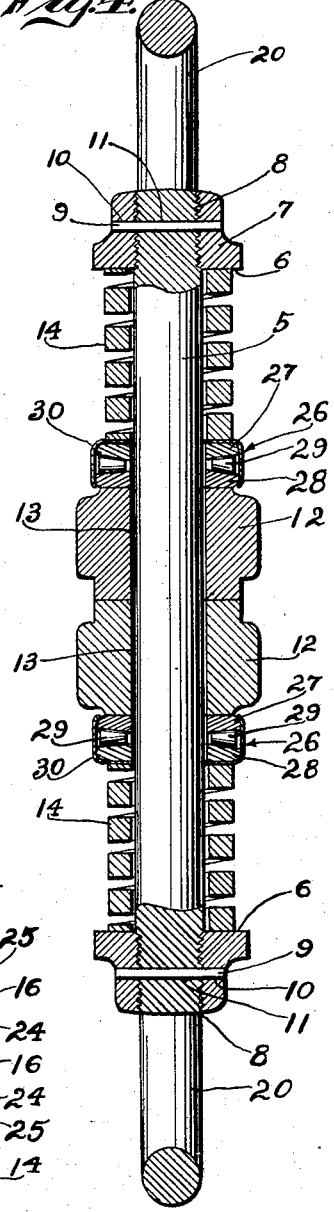
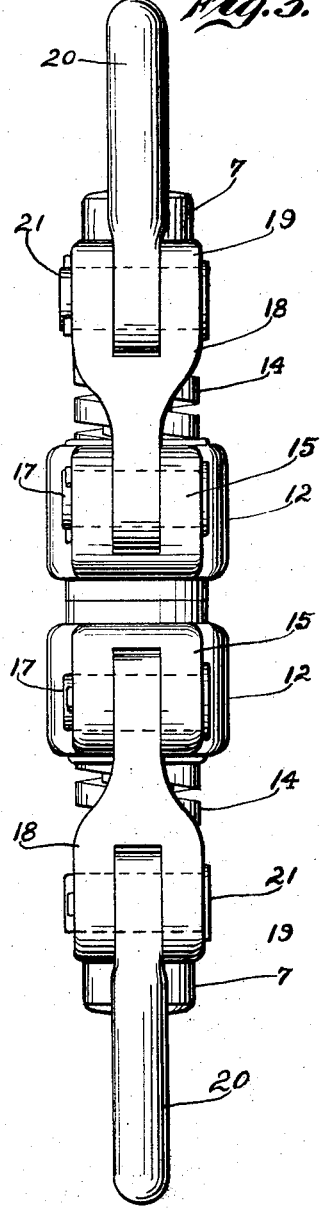
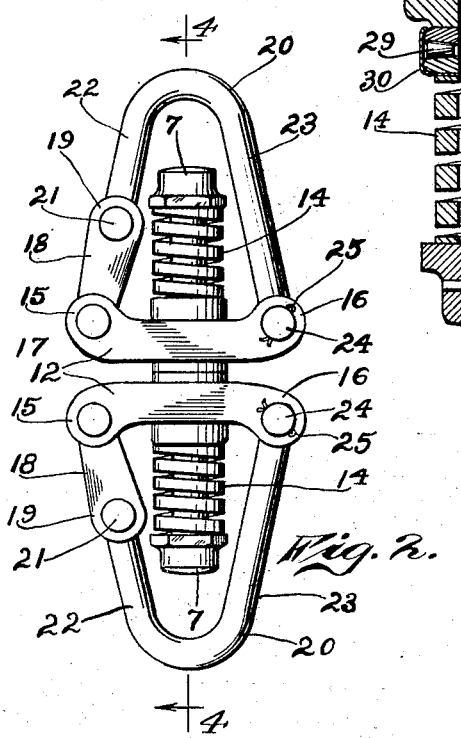
Inventor
James P. Ratigan;
By Lyon & Lyon
Attorney Patented Aug. 23, 1932

1,873,325

UNITED STATES PATENT OFFICE

JAMES P. RATIGAN, OF LOS ANGELES, CALIFORNIA

SHOCK ABSORBING CONNECTER

Application filed September 23, 1929. Serial No. 394,468.

This invention relates to shock absorbing connecters and, more especially, to the type of connecter employing a pair of resilient members for absorbing shocks.

An object of the invention is the general improvement of shock absorbing connecters.

Another object is to provide a construction which will minimize the diameter of the springs.

Another object is to make provision for swivelling between the arbor, that connects the two hook members, and said hook members.

Another object is to make provision for opposed resilient members operating in opposite directions to absorb shocks.

Another object is to provide a construction which will enable the resilient members to absorb shocks by working in both directions.

Other objects and advantages will appear in the subjoined detailed description.

The accompanying drawing illustrates the invention.

Figure 1 is a side view of a shock absorbing connecter constructed in accordance with the provisions of this invention, the parts being shown in the expanded condition as results when a load is imposed on the connecter. A block and tackle, a rod elevator and a fragment of a sucker rod, are indicated in broken lines.

Figure 2 is an enlarged view of the shock absorbing connecter shown in Figure 1, with the parts in their contracted condition, as occurs when there is no load imposed on the connecter.

Figure 3 is an enlarged edge view of Figure 2 from the left thereof.

Figure 4 is an enlarged vertical section on the line indicated by 4—4 Figure 2.

There is provided an arbor 5 which, in this instance, is of circular cross section. The arbor 5 is provided at its opposite ends with shoulders 6 which, in this instance, are formed by the inner faces of nuts 7 which are threaded at 8 upon the arbor. The nuts 7 may be further secured against becoming detached from the arbor by pins 9 which extend through holes 10 in the nuts and holes 11 in the arbor.

A pair of sliding abutments 12 is provided, each of said abutments having a circular bore 13 through which the arbor extends. Resilient shock absorbing members 14 are interposed between the shoulders 6 and the abutments 12. Preferably, the shock absorbing members 14 are in the form of relatively heavy coil springs. It will be seen that if but one spring were employed it would be necessary to construct it of larger diameter and of much heavier material to absorb equally well the same load imposed on the two springs.

The abutments 12, in this instance, are in the form of cross members and suitable connection means are provided for each of the cross members. These connection means, in each instance, are of like construction and, accordingly, only one of them need be described in detail as follows:

The cross member 12 has bifurcated or forked ends 15, 16. Extending into the fork 15 and pivotally secured thereto by a pin 17 is a link 18. The link 18 has a bifurcated or forked end 19 which receives one end of a hook shaped member 20 which is pivotally secured to the fork 19 by a pin 21.

The hook shaped member 20 has a shorter leg 22 and a longer leg 23, said legs being divergent. It is the leg 22 that is secured to the fork 19. The hook shaped member 20 may be of circular cross section excepting at its ends, which are preferably flat for the reception, at one end, of the pin 21 and, at the other end, of a loose pin 24 which detachably connects the hook shaped member 20 to the cross member. The pin 24 may itself be locked against accidental displacement by a cotter pin 25 or its equivalent.

Since it is desirable that the connecter act as a swivel it is preferable to provide thrust bearings 26 between the members 12 and the inner ends of the springs 14. These bearings 26 are preferably of the roller or other antifriction type and, in this instance, each bearing comprises opposed race members 27, 28 with rollers 29 therebetween, and an outer case 30 which encloses the edge of the race members 27, 28.

The invention operates as follows: Assuming, for example, that the connecter is to be used between a block and tackle, indicated at A in Figure 1, and an elevator, indicated at B, the pins 24 will be removed and the hook shaped members 20 swung on the pivots 21 into open position and the link C of the block and tackle will then be slipped over one of said members 20 and said member will then be swung closed and its associated pin 24 placed in position to lock the member 20 to the cross member 12. Also the bail D of the elevator B will be slipped over the lower hook shaped member 20 and said hook shaped member 20 will be secured to the associated cross member 12 by its pin 24.

When the block and tackle are raised to impose the load of the elevator B and the sucker rod string E thereon, the cross members 12 will move away from one another and compress the springs 14. It will be seen that the arbor 5 floats between said springs and that, if the shock is very severe, the springs 14 will be compressed beyond what the load at rest would compress them and that, accordingly, after the first shock is over the springs 14 will expand to some extent, thus completely absorbing the shock of picking up the load.

Relative swivelling of the members 12 is afforded and the swivelling may take place at either or both of the bearings 26, but it is to be understood that one of said bearings could be omitted so that all of the swivelling would tend to take place at the bearing that remains.

I claim:

1. A shock absorbing connecter comprising an arbor provided with a shoulder at one end, a cross member slidably mounted on the arbor, a resilient member between the shoulder and the cross member, a link pivotally connected at one end to the cross member, a hook-shaped member having legs of unequal lengths, a shorter leg pivotally connected to the link, and means pivotally connecting the longer leg to the other end of the cross member, one of the pivotal connections being releasable to permit of the hook-shaped member being swung away from the cross member, and the arbor extending between the link and the longer leg of the hook-shaped member.

2. A shock absorbing connecter comprising an arbor provided with a shoulder at one end, a cross member slidably mounted on the arbor, a resilient member between the shoulder and the cross member, a link pivotally connected at one end to the cross member, a hook-shaped member having legs of unequal lengths diverging toward the cross member, the shorter leg pivotally connected to the link, and means pivotally connecting the longer leg to the other end of the cross member, one of the pivotal connections being releasable to permit of the hook-shaped member being swung away from the cross member, and the arbor extending between the link and the longer leg of the hook-shaped member.

3. A shock absorbing connecter comprising an arbor provided with a shoulder at one end, a cross member slidably mounted on the arbor, a thrust bearing on the arbor between the shoulder and the cross member, a resilient member between the shoulder and the bearing, the cross member projecting in opposite directions beyond the bearing, a link pivotally connected at one end to one of the projecting ends of the cross member, a hook-shaped member having legs of unequal lengths, the shorter leg pivotally connected to the link, and a means pivotally connecting the longer leg to the other projecting end of the cross member, one of the pivoted connections being releasable to permit of the hook-shaped member being swung away from the cross member, and the arbor extending between the link and the longer leg of the hook-shaped member.

Signed at Los Angeles, California, this 11th day of September, 1929.

JAMES P. RATIGAN.